United States Patent
Kumazawa (10) Patent No.: US 7,108,634 B2
(45) Date of Patent: Sep. 19, 2006

(54) APPARATUS AND METHOD FOR CONTROLLING CLUTCH OF MECHANICAL AUTOMATIC TRANSMISSION

(75) Inventor: Atsushi Kumazawa, Tokyo (JP)

(73) Assignee: Mitsubishi Fuso Truck and Bus Corporation, Tokyo (JP)

(*) Notice: Subject to any disclaimer, the term of this patent is extended or adjusted under 35 U.S.C. 154(b) by 116 days.

(21) Appl. No.: 10/809,377

(22) Filed: Mar. 26, 2004

(65) Prior Publication Data

US 2004/0192504 A1    Sep. 30, 2004

(30) Foreign Application Priority Data

Mar. 31, 2003    (JP) .............. 2003-095438

(51) Int. Cl.
*B60K 41/02*    (2006.01)

(52) U.S. Cl. ..................... 477/176; 477/181

(58) Field of Classification Search ............ 477/181, 477/180, 176
See application file for complete search history.

(56) References Cited

U.S. PATENT DOCUMENTS 4,766,544 A * 8/1988 Kurihara et al. .......... 701/67
5,184,301 A * 2/1993 Stasell .................. 701/110
5,638,271 A * 6/1997 White et al. ............. 701/64
6,071,211 A * 6/2000 Liu et al. ............... 477/175
6,582,341 B1 * 6/2003 Groene et al. ........... 477/181
6,785,602 B1 * 8/2004 Grone et al. ............. 701/110

FOREIGN PATENT DOCUMENTS

| CN | 1113470 A | 12/1995 |
|---|---|---|
| CN | 2361505 Y | 2/2000 |
| EP | 0677684 A1 | 10/1995 |
| JP | 6-117454 A | 4/1994 |
| JP | 9-217762 A | 8/1997 |
| JP | 2002-286060 A | 10/2002 |

\* cited by examiner

*Primary Examiner*—Dirk Wright
(74) *Attorney, Agent, or Firm*—Birch, Stewart, Kolasch & Birch, LLP (57) ABSTRACT

The present invention aims at providing an apparatus and method for controlling a clutch of a mechanical automatic transmission which enables smoother start of movement. To this end, range setting means sets an engine speed range in which engine output torque achieved at an accelerator position detected by accelerator position detection means defines a predetermined range including the maximum value. Clutch control means throws in a clutch while controlling a connected state of a clutch such that the engine speed detected by engine speed detection falls within the engine speed range set by the range setting means.

19 Claims, 7 Drawing Sheets

APPARATUS AND METHOD FOR CONTROLLING CLUTCH OF MECHANICAL AUTOMATIC TRANSMISSION

This Nonprovisional application claims priority under 35 U.S.C. § 119(a) on Patent Application No(s). 2003-095438 filed in JAPAN on Mar. 31, 2003, the entire contents of which are hereby incorporated by reference.

BACKGROUND OF THE INVENTION

1) Field of the Invention

The present invention relates particularly to an apparatus and method for controlling a clutch of a mechanical automatic transmission which is suitable for use in controlling a clutch at the time a vehicle starts to move (hereinafter may be called "at the time of start").

2) Description of the Related Art

A vehicle—which is equipped with a mechanical automatic transmission arranged to enable automatic transmission by providing a change gear mechanism and a clutch mechanism respectively with an actuator—performs clutch partial engagement control operation at the time of start (or when the vehicle moves slowly). As shown in, e.g., FIG. 8, the clutch partial engagement control is performed on the basis of a map of a clutch stroke speed with respect to a rate of change in an engine speed (i.e., a differential value of the engine speed).

Figure 8:
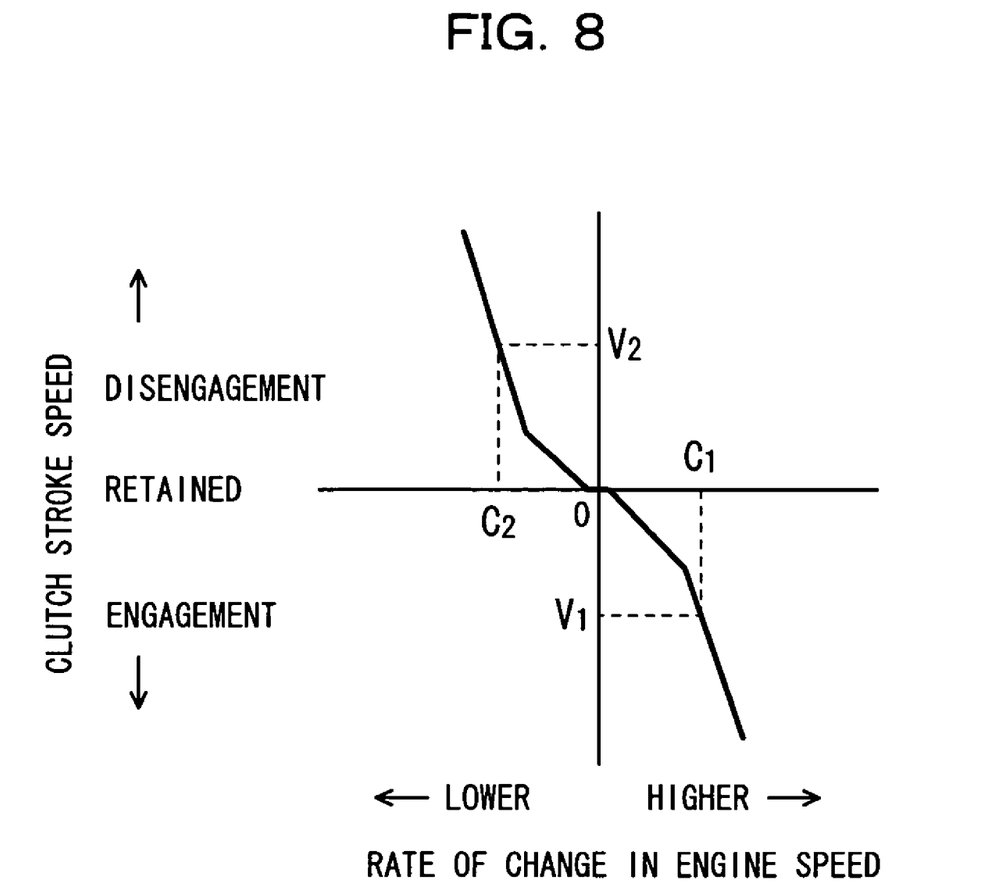
FIG. 8 is a map for setting a clutch stroke speed with respect to a rate of change in a conventional engine.

For instance, the rate of change in engine speed is $C_1$ ($C_1>0$), the clutch is controlled so as to move toward an engagement direction at a stroke speed $V_1$. When the rate of change in engine speed is $C_2$ ($C_2<0$), the clutch is controlled so as to move toward a disengagement direction at a stroke speed $V_2$. When the rate of change in engine speed is zero, the clutch is controlled so as to stay at the current position.

As a result, at the time of start of the vehicle, clutch partial engagement control operation is commenced at a point in time when a driver has stepped on an accelerator, and the clutch is gradually engaged, to thus accelerate the vehicle.

JP-A-6-117454 (hereinafter called "Patent Publication 1") describes a technique for computing a target engine speed at which a clutch is to be thrown in for smoothly driving a vehicle, from throttle opening achieved at the time of start, thereby increasing or decreasing an exciting current for an electromagnetic powder clutch such that an actual engine speed attains the target engine speed.

Figure 9:
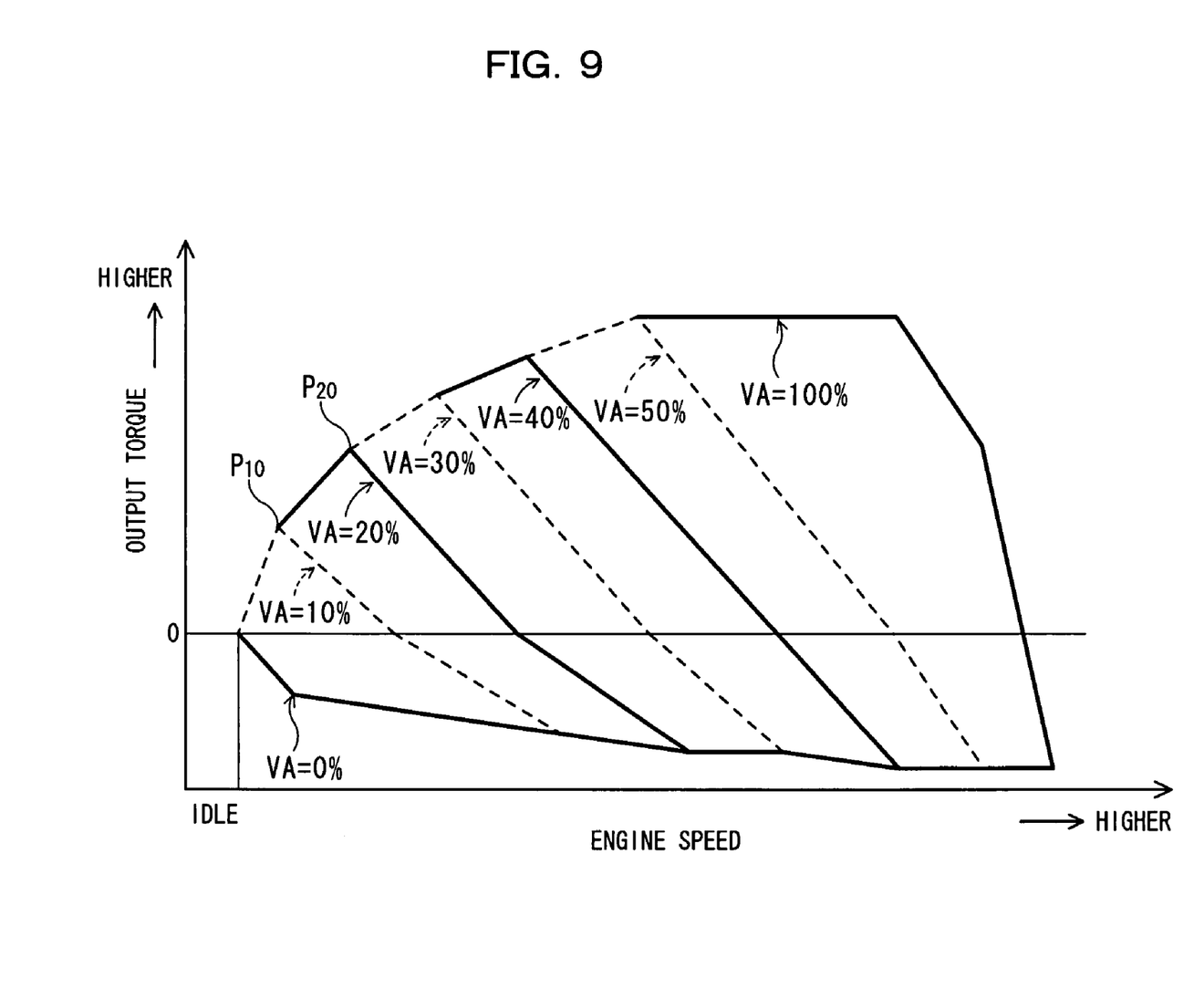
FIG. 9 is a diagram showing an engine output characteristic of a common engine.

In a diesel engine, engine output torque corresponding to an accelerator position VA (%) set by the driver has a characteristic with respect to the engine speed such as that shown in FIG. 9.

As shown in FIG. 9, for example, when the accelerator position is 0%, output torque assumes a value of 0 at an idle speed of 650 rpm. When the idle speed has increased to become higher than the engine speed, the engine output torque gradually decreases.

For instance, when the accelerator position is 10%, the higher the engine speed, the higher the engine output torque. However, the engine output torque has reached a peak (maximum torque) at a certain engine speed $P_{10}$, the engine output torque gradually decreases in subsequent operation. Similarly, even when the accelerator position is 20%, the higher the engine speed, the higher the engine output torque. However, the engine output torque reaches a peak at a certain engine speed $P_{20}$, and the engine output torque gradually decreases in subsequent operation.

As mentioned above, the diesel engine has a parabolic characteristic, wherein, as the accelerator position increases, the peak of the engine speed shifts to a higher range, and the engine output torque gradually decreases after the engine speed has exceeded the peak.

Therefore, when the clutch partial engagement control operation is performed at the time of start of a vehicle without taking into consideration such an output torque characteristic, the clutch may be partially engaged while the engine speed remains below the engine speed achieved at the peak (the maximum torque output) (i.e., a drop has arisen in engine speed) or higher than the engine speed achieved at the peak (i.e., a hike has arisen in engine speed).

In this case, even when clutch partial engagement operation has been performed, sufficient drive torque cannot be output, because the engine output torque is too low, thus posing difficulty in smooth start of the vehicle. Particularly, this problem becomes noticeable when the vehicle starts moving while on an uphill or when a vehicle with a heavy load starts moving.

In association with occurrence of such a problem, the time which lapses before the vehicle starts moving becomes longer; that is, the time during which the clutch is partially thrown in becomes longer, and hence the clutch may become abraded early, or noise due to an excessive hike in the engine speed may increase.

According to the previously-described technique of Patent Document 1, the engine speed at which maximum torque can be achieved is not set as a target rotational engine speed at all times. For this reason, when the vehicle is under heavy load, difficulty is encountered in smoothly starting the vehicle. Moreover, the clutch described in Patent Document 1 is of electromagnetic power type, wherein no attention is paid to abrasion developing in the clutch.

SUMMARY OF THE INVENTION

The present invention has been conceived in view of the foregoing drawback and aims at providing an apparatus and method for controlling a clutch of a mechanical automatic transmission enabling smooth start.

To this end, the present invention is characterized by a clutch controller of a mechanical automatic transmission which enables automatic transmission operation by means of providing a transmission gear mechanism with an actuator and a clutch mechanism with an actuator, the controller comprising: engine speed detection means for detecting an engine speed; accelerator position detection means for detecting the position of an accelerator; range setting means for setting an engine speed range in which engine output torque falls within a predetermined range including a maximum value at the position of the accelerator detected by the accelerator position detection means; and control means which effects direct engagement of a clutch when a vehicle is pulled away while controlling a connected state of the clutch such that the engine speed detected by the engine speed detection means falls within the engine speed range set by the range setting means.

According to this controller, output torque can be ensured at the start of a vehicle, thereby enabling smooth start. Accordingly, when the vehicle starts to go while on an uphill or when the vehicle with a heavy load starts, stable start required by the driver becomes feasible.

Further, the partially-engaged clutch time can be diminished when compared with the case of a conventional clutch, and hence early abrasion of the clutch can be suppressed. Moreover, occurrence of an engine stall, which would otherwise be caused by an excessive drop in the engine speed in a low-rotational speed range, can be prevented, as can occurrence of an excessive hike in the engine speed within a high speed range, thereby preventing generation of noise.

The range setting means preferably sets a first threshold value at an engine speed lower than an engine speed at which the engine output torque becomes maximum at the position of the accelerator and sets a second threshold value at an engine speed higher than the engine speed, thereby setting the engine speed range.

The first threshold value and the second threshold value are preferably set in accordance with the position of the accelerator.

The control means preferably comprises a storage section for storing a map in which clutch stroke speeds corresponding to a rate of change in the engine speed are set with regard to three ranges; namely, a first range which is lower in engine speed than the first threshold value, a second range falling between the first threshold value and the second threshold value, and a third range higher in engine speed than the second threshold value; a determination section for determining which one of the three ranges that the engine speed detected by the engine speed detection means falls within; and a clutch control section which selects from the map a clutch stroke speed corresponding to the range determined by the determination section and controls the clutch stroke speed of the clutch.

The storage section preferably stores, as the map, control lines corresponding to the three ranges on coordinates formed from the rate of change in the engine speed and the clutch stroke speed; the control line of the second range is set so as to increase the clutch stroke speed in a clutch engagement direction when the rate of change in the engine speed has increased and to increase the clutch stroke speed in a clutch disengagement direction when the rate of the engine speed has decreased; and the control line of the first range is preferably a line obtained as a result of the control line in the second range having been shifted toward an increase in the rate of change in the engine speed, and the control line of the third range is a line obtained as a result of the control line of the second range having been shifted toward a decrease in the rate of change in the engine speed.

The storage section preferably stores a map in which are set clutch stroke speeds corresponding to the rate of change in the engine speed in connection with a plurality of ranges into which the first range has been divided; the determination section determines which one of the plurality of ranges within the first range includes the engine speed detected by the engine speed detection means when the detected engine speed falls within the first range; and the clutch control section preferably controls the clutch stroke speed of the clutch by means of selecting, from the map, a clutch stroke speed corresponding to the range determined by the determination section.

The storage section preferably stores, as the map, sub-control lines corresponding to the plurality of ranges within the first range on coordinates formed from the rate of change in engine speed and the clutch stroke speed; and the sub-control lines assigned to the plurality of ranges within the first range are preferably formed by shifting at intervals the control line of the second range toward an increase in the rate of the engine speed.

The storage section preferably stores a map in which are set clutch stroke speeds corresponding to the rate of change in the engine speed in connection with a plurality of ranges into which the third range has been divided; the determination section preferably determines which one of the plurality of ranges within the third range includes the engine speed detected by the engine speed detection means when the detected engine speed falls within the third range; and the clutch control section preferably controls the clutch stroke speed of the clutch by means of selecting, from the map, a clutch stroke speed corresponding to the range determined by the determination section.

The storage section preferably stores, as the map, sub-control lines corresponding to the plurality of ranges within the third range on coordinates formed from the rate of change in engine speed and the clutch stroke speed; and the sub-control lines assigned to the plurality of ranges within the third range are preferably formed by shifting at intervals the control line of the second range toward a decrease in the rate of the engine speed.

A method for controlling a clutch of a mechanical automatic transmission which enables automatic transmission operation by means of providing a transmission gear mechanism with an actuator and a clutch mechanism with an actuator, the method comprising the steps of: detecting an engine speed and the position of an accelerator; setting a first threshold value at an engine speed lower than an engine speed at which the engine output torque becomes maximum at the detected position of the accelerator and setting a second threshold value at an engine speed higher than the engine speed; and effecting direct engagement of the clutch while controlling a connected state of the clutch such that the detected engine speed falls between the set first threshold value and the second threshold value.

According to this method, output torque can be ensured at the start of a vehicle, thereby enabling smooth starting. Accordingly, when the vehicle starts while on an uphill or when the vehicle with a heavy load starts, stable start required by the driver becomes feasible.

Preferably, when the detected engine speed is lower than the first threshold value, the clutch is controlled so as to be disengaged; and, when the detected engine speed is higher than the second threshold value, the clutch is controlled so as to be engaged.

A low engine speed sub-threshold value is preferably set at an engine speed which is lower than the first threshold value; and, when the detected engine speed is lower than the engine speed sub-threshold value, a clutch stroke speed is preferably increased toward the clutch disengagement direction as compared with a case where the detected engine speed falls between the first threshold value and the low engine speed sub-threshold value.

A plurality of the low engine speed sub-threshold values are preferably set at engine speeds lower than the first threshold value; and, when the detected engine speed falls between an $(n+1)^{th}$ (n: natural number) low engine speed sub-threshold value and an $(n+2)^{th}$ low engine speed sub-threshold value toward a lower engine speed from the first threshold value, the clutch stroke speed is preferably increased toward the clutch disengagement direction as compared with a case where the detected engine speed falls between an $n^{th}$ low engine speed sub-threshold value and the $(n+1)^{th}$ low engine speed sub-threshold value.

A high engine speed sub-threshold value is preferably set at an engine speed higher than the second threshold value; and, when the detected engine speed is higher than the high engine speed sub-threshold value, the clutch stroke speed is increased toward the clutch engagement direction as compared with a case where the detected engine speed falls between the first threshold value and the high engine speed sub-threshold value.

A plurality of the high engine speed sub-threshold values are set at engine speeds higher than the first threshold value;

and, when the detected engine speed falls between an $(n+1)^{th}$ (n: natural number) high engine speed sub-threshold value and an $(n+2)^{th}$ high engine speed sub-threshold value toward a higher engine speed from the first threshold value, the clutch stroke speed is increased toward the clutch engagement direction as compared with a case where the detected engine speed falls between an $n^{th}$ high engine speed sub-threshold value and the $(n+1)^{th}$ high engine speed sub-threshold value.

DESCRIPTION OF THE PREFERRED EMBODIMENTS

An embodiment of the present invention will be described hereinbelow by reference to the drawings.

Figure 1:
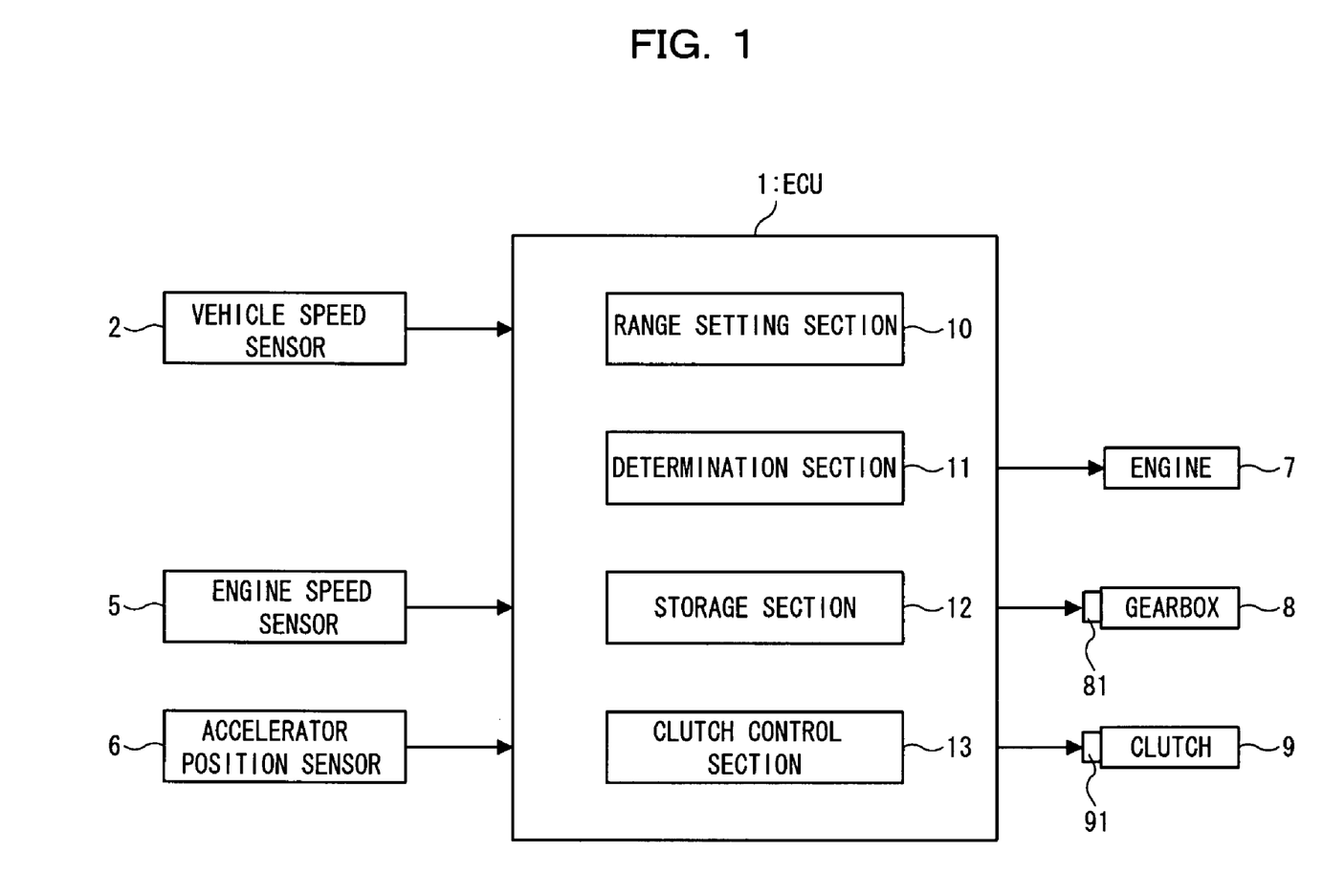
FIG. 1 is a block diagram schematically showing a vehicle equipped with an apparatus for controlling a mechanical automatic transmission according to an embodiment of the present invention.

FIGS. 1 through 6 are for describing an apparatus and method for controlling the clutch of a mechanical automatic transmission according to an embodiment of the invention. As shown in FIG. 1, the mechanical automatic transmission is arranged so as to enable automatic transmission by means of providing a gearbox (a speed-change gear mechanism) 8 and a clutch (a clutch mechanism) 9, which are analogous to those of a manual transmission vehicle, with actuators 81 and 91, respectively.

Figure 2:
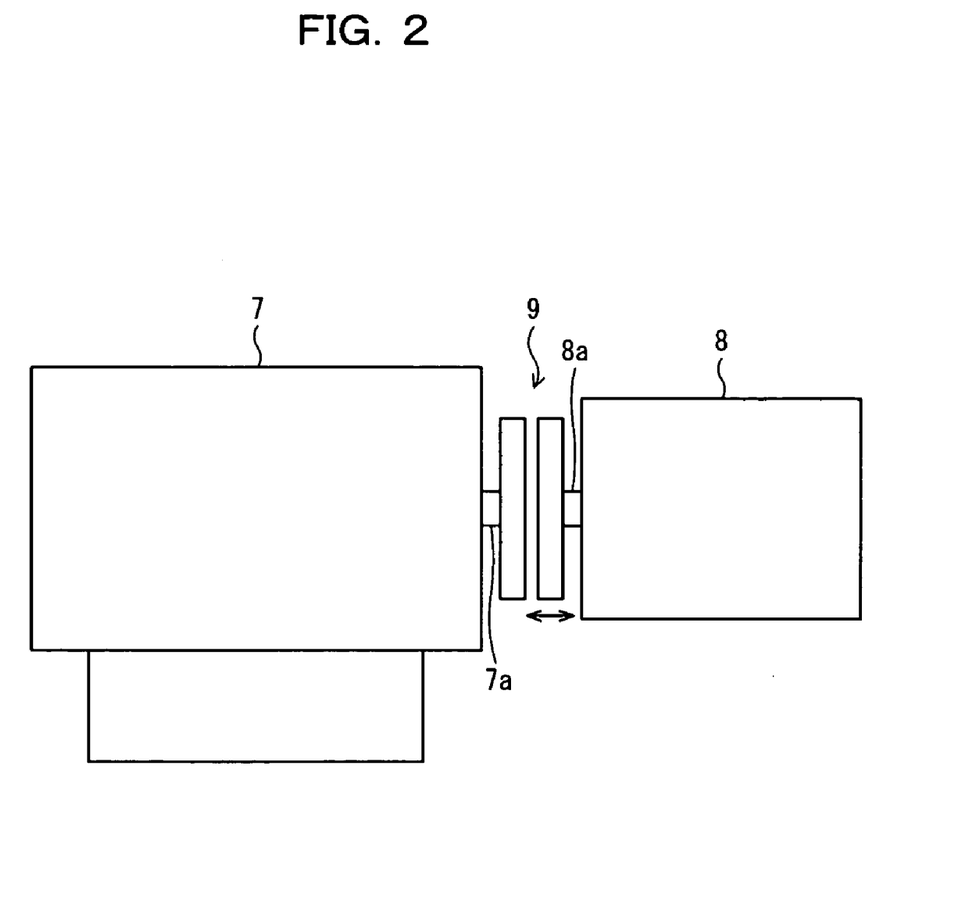
FIG. 2 is a block diagram schematically showing a vehicle according to the embodiment of the present invention.

As shown in FIG. 2, the vehicle of the present embodiment is provided with an engine 7, the gearbox 8, and the clutch 9, and an output shaft 7a of the engine 7 and an input shaft 8a of the gearbox 8 are connected together by way of the clutch 9.

When the clutch 9 is thrown in, the engine torque output from the engine 7 is transmitted to a drive wheel (not shown) by way of the gearbox 8, thereby driving the vehicle. In FIG. 2, the arrow designates the direction in which a clutch plate is to be actuated.

As shown in FIG. 1, the clutch 9 is controlled by an ECU 1, as are the engine 7 and the gearbox 8. In detail, the clutch 9 is controlled by means of driving the actuator 91.

Accordingly, the ECU 1 is supplied with a signal output from a vehicle speed sensor 2 for detecting the speed of the vehicle, a signal output from an engine speed sensor (i.e., engine speed detection means) 5 which detects or computes the number of rotations of the engine output shaft 7a, and a signal output from an accelerator position sensor (APS; accelerator position detection means) 6 for detecting the extent to which an accelerator pedal (not shown) is depressed.

Figure 3:
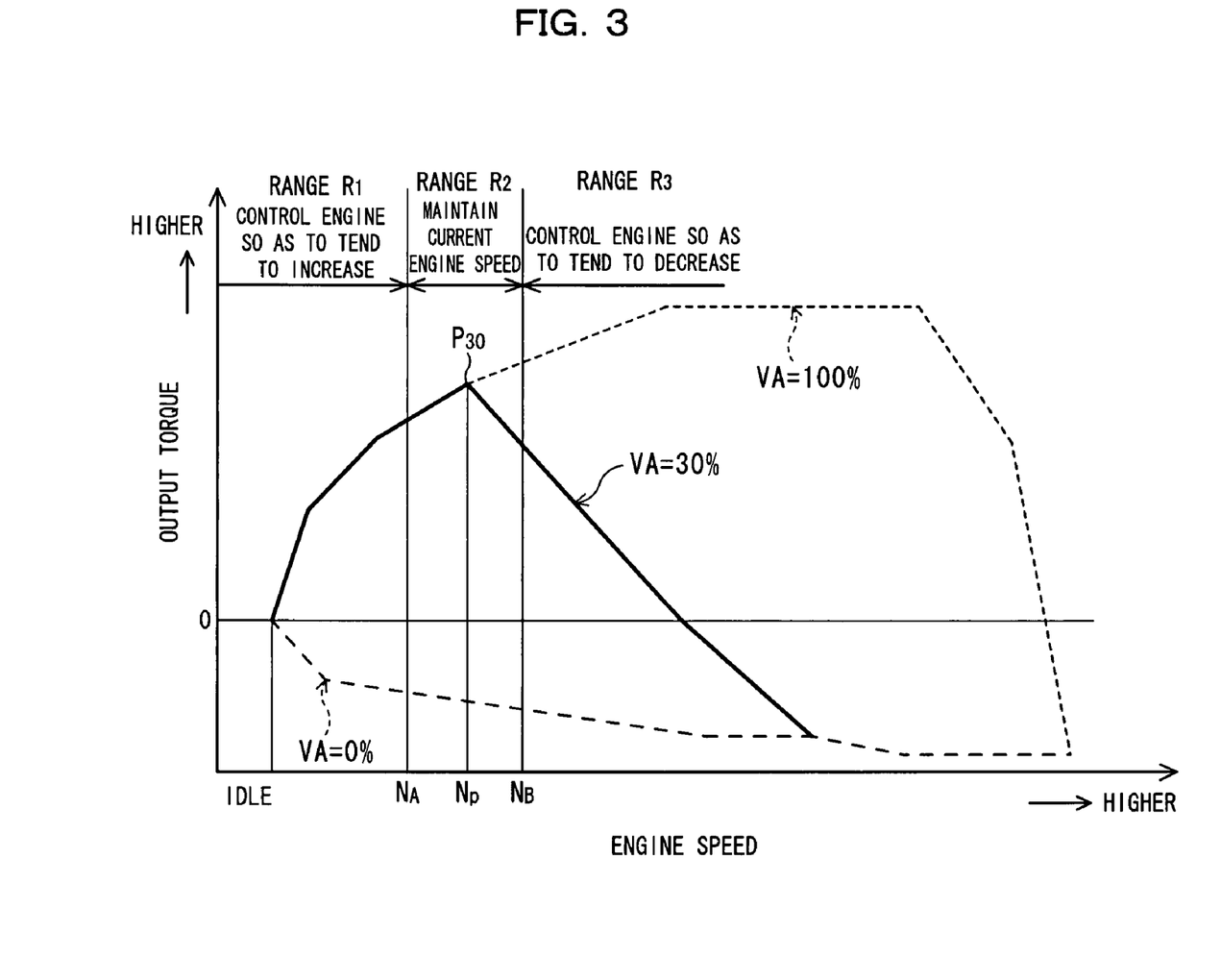
FIG. 3 is a diagram showing an engine output characteristic for describing range setting means according to the embodiment of the present invention.
Figure 4:
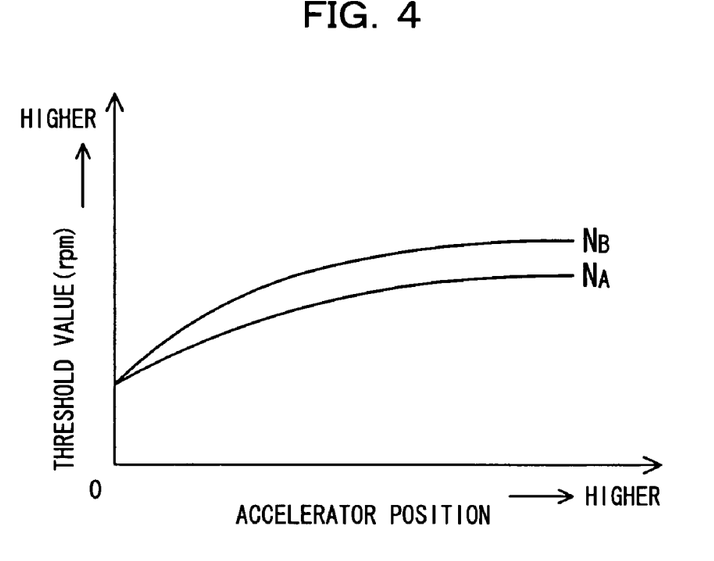
FIG. 4 is a map for setting a threshold value of an accelerator position according to the embodiment of the present invention.

As mentioned previously, the engine output torque with respect to the driver's accelerator position VA(%) essentially has a characteristic with respect to the engine speed such as that shown in FIG. 3. FIG. 3 shows an engine output characteristic of a diesel engine; that is, output torque characteristics achieved when the accelerator position is 0%, 30%, and 100%.

The controller makes up for a deficiency in torque, which arises at start (or during slow motion) of the vehicle equipped with the mechanical automatic transmission, thereby performing optimum clutch partial engagement control which enables more smooth start of the vehicle. By way of an example, clutch partial engagement control to be performed at an accelerator position of 30% will now be described.

As shown in FIG. 1, the controller has functions corresponding to a range setting section (range setting means) 10, a determination section 11, a storage section 12, and a clutch control section 13. Here, control means is constituted of the determination section 11, the storage section 12, and the clutch control section 13.

The range setting section 10 is arranged to set an engine speed range in which the engine output torque assumes a predetermined range including a maximum value at the accelerator position detected by the accelerator position sensor 6.

Specifically, as shown in FIG. 3, a threshold value (i.e., a first threshold value) $N_A$ is set to an engine speed lower than the engine speed $N_P$ at which output torque assumes a peak (i.e., maximum output torque) $P_{30}$, and another threshold value (i.e., a second threshold value) $N_B$ is set to an engine speed higher than the engine speed $N_P$. Thereby, the engine speed is divided into three ranges; that is, a range $R_1$ which is lower in engine speed than the threshold value $N_A$; a range $R_2$ which is located between the threshold values $N_A$ and $N_B$; and a range $R_3$ which is higher in engine speed than the threshold value $N_B$.

In the embodiment, the threshold values $N_A$ and $N_B$ are set so as to be substantially equidistant from the engine speed $N_P$, and the range of engine speed between the threshold values $N_A$ and $N_B$ is set to, e.g., 300 to 400 rpm.

Since the engine output torque characteristic shown in FIG. 3 is a schematic view, the peak $P_{30}$ is shown to be pointed. However, if the vertex of the peak $P_{30}$ assumes the shape of a gentle-sloping curve, the range of rotational speed is preferably set wider.

As a matter of course, the maximum output torque (peak) changes according to the accelerator position, and hence the threshold values $N_A$ and $N_B$ are set according to the accelerator position so that engine output torque corresponding to the accelerator position can be obtained. For example, the threshold values $N_A$, $N_B$ are preferably set on the basis of the map shown in FIG. 4.

The determination section 11 determines which one of the ranges $R_1$, $R_2$, and $R_3$ includes the engine speed detected by the engine speed sensor 5.

Figure 5:
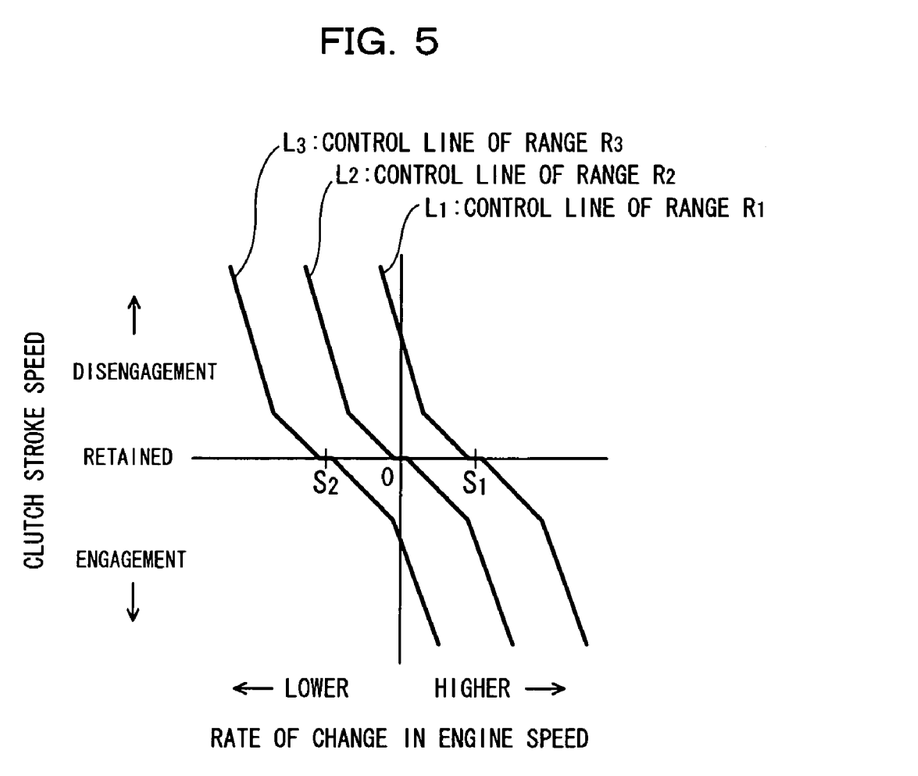
FIG. 5 is a map for setting a clutch stroke speed with respect to a rate of change in engine speed according to the present embodiment of the invention.
Figure 6:
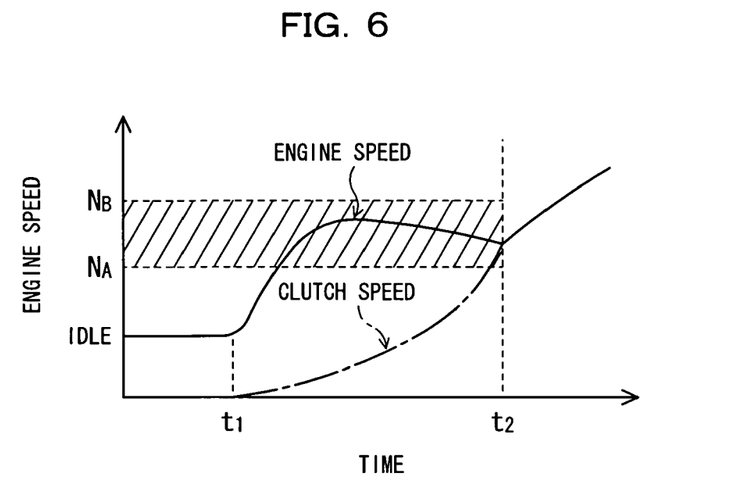
FIG. 6 is a graph showing a change in engine speed achieved at the start of the vehicle according to the embodiment of the present invention.

As shown in FIG. 5, the storage section 12 stores a map of a clutch stroke speed with respect to the rate of a change in engine speed (i.e., a differential value of the engine speed).

The map includes three control lines $L_1$, $L_2$, and $L_3$. On the basis of a result of determination made by the determination section 11, the clutch control section 13 selects anyone from the three control lines, as required, and the thus-selected line is used for controlling the clutch at start of the vehicle.

Here, the respective control lines are described. First, the line $L_2$ is a control line used for controlling the conventional clutch, as well. The line $L_2$ shows that the clutch stroke is retained at the current position when the rate of change in engine speed is 0 (neither increases nor decreases). Further, the line $L_2$ also shows that, when the rate of change in engine speed is increasing, the clutch stroke speed toward the direction of clutch engagement (i.e., an engagement direction) is increased and that, when the engine speed is decreasing, the clutch stroke speed toward the direction of disengagement of the clutch (a disengagement direction) is increased.

The line $L_1$ is a control line obtained by means of shifting the line $L_2$ toward a direction in which the rate of change in engine speed ascends (i.e., a rightward direction in FIG. 5), by a predetermined rate of change $S_1$. Specifically, the line $L_1$ shows that the clutch stroke is retained at the current position when the rate of change in engine speed is $S_1$ ($S_1 > 0$). When the rate of change in engine speed is greater than $S_1$, the clutch stroke speed toward the direction of clutch engagement (i.e., the engagement direction) is increased. When the rate of change in engine speed is lower than $S_1$, the clutch stroke speed toward the direction of clutch disengagement (i.e., the disengagement direction) is increased.

When attention is paid to, e.g., a case where the rate of change in engine speed is 0, the line $L_1$ shows an increase in the clutch stroke speed toward the clutch disengagement direction.

Therefore, when the clutch is controlled in accordance with the line $L_1$, the rate of change in engine speed gradually converges to $S_1$, and the clutch stroke is retained in the state of $S_1$ (i.e., the clutch is engaged such that the engine speed increases), and hence the engine can be retained at a high rotational speed. As a result, engine speed in the range $R_1$ can be increased to the range $R_2$, and the torque achieved in the range $R_2$; that is, torque close the maximum torque, can be output.

The line $L_3$ is a control line formed by means of shifting the line $L_2$ toward the direction in which the rate of change in engine speed descends (i.e., a leftward direction in FIG. 5) by a predetermined rate of change $S_2$. The line $L_3$ shows that the clutch stroke is retained at the current position when the rate of change in engine speed $S_2$ ($S_2 > 0$) is achieved. When the rate of change in engine speed is greater than $S_2$, the clutch stroke is increased toward clutch engagement (i.e., the engagement direction). When the rate of change in engine speed is lower than $S_2$, the clutch stroke is increased toward clutch disengagement (i.e., the disengagement direction).

When attention is paid to, e.g., a case where the rate of change in engine speed is 0, the line $L_3$ shows an increase in the clutch stroke speed toward the clutch engagement direction.

Therefore, when the clutch is controlled in accordance with the line $L_3$, the rate of change in engine speed gradually converges to $S_2$, and the clutch stroke is retained in the state of $S_2$ (i.e., the clutch is engaged such that the engine speed decreases), and hence the engine can be retained at a low rotational speed. As a result, engine speed in the range $R_3$ can be decreased to the range $R_2$, and the torque achieved in the range $R_2$; that is, torque close the maximum torque, can be output.

When a change has arisen in the accelerator position output from the accelerator position sensor 6 at the start of the vehicle; that is, when the vehicle speed detected by the vehicle speed sensor 2 is at a predetermined speed or less, any one of the lines $L_1$, $L_2$, and $L_3$ is selected from the map stored in the storage section 12 on the basis of the result of determination made by the determination section 11, to thus control the clutch 9.

Specifically, when the determination section 11 has determined that the engine speed falls within the range $R_1$, the clutch control section 13 selects the line $L_1$ from the map, to thus perform clutch partial engagement operation while controlling the clutch stroke in accordance with the line $L_1$.

When the determination section 11 has determined that the engine speed falls within the range $R_2$, the clutch control section 13 selects the line $L_2$ from the map and performs clutch partial engagement while controlling the clutch stroke in accordance with the line $L_2$. Further, when the determination section 11 has determined that the engine speed falls within the range $R_3$, the clutch control section 13 selects the line $L_3$ from the map and performs clutch partial engagement while controlling the clutch stroke in accordance with the line $L_3$.

Specifically, when the engine speed falls within the range $R_1$, the clutch control section 13 performs clutch partial engagement control so as to increase the engine speed (i.e., the engine speed is on the high side). When the engine speed falls within the range $R_2$, the clutch control section 13 performs clutch partial engagement control so as to maintain the engine speed. When the engine speed falls within the range $R_3$, the clutch control section 13 performs clutch partial engagement control so as to decrease the engine speed (i.e., the engine speed is on the down side).

The clutch controller of the mechanical automatic transmission according to the embodiment of the invention is configured as mentioned previously. As shown in, e.g., FIG. 6, when the driver has pressed down on the accelerator to start the vehicle (i.e., a point in time $t_1$ shown in FIG. 6), the engine speed increases. However, clutch partial engagement control is performed such that the engine sped falls between the threshold values $N_A$ and $N_B$, and the clutch is completely engaged when the engine speed has become synchronized with the clutch speed (i.e., a point in time $t_2$ shown in FIG. 6), whereupon the clutch partial engagement control is terminated.

As mentioned previously, according to the controller and controlling method of the invention, the drive torque can be ensured without fail even at the time of start of the vehicle, and hence a deficiency in torque, which arises at the start of the vehicle in the related art, can be made up for, thereby enabling a smoother start. Consequently, for example, when a vehicle starts while on an uphill or a vehicle with heavy load starts, stable start required by the driver becomes feasible.

The vehicle has hitherto failed to start smoothly because of a deficiency in torque, and hence the time required to perform clutch partial engagement becomes excessive. However, according to the controller and controlling method of the invention, the smooth start required by the driver is feasible, and hence the time required to perform clutch partial engagement can be reduced as compared with the case of the conventional clutch, and hence early abrasion of the clutch can be suppressed.

Further, there can be prevented occurrence of engine stall, which would otherwise be caused by an excessive decrease in the engine speed in the low speed range (i.e., the engine stalls as a result of the engine output torque having failed to overcome the load of the engine). Further, an excessive hike in the engine speed in the high speed range can be prevented, which in turns prevents issuance of noise.

Although the embodiment of the invention has been described thus far, the present invention is not limited to the embodiment and can be carried out while being modified variously without departing from the gist of the present invention.

For instance, the embodiment is configured such that, when the engine speed is lower than the threshold value $N_A$ (i.e., in the range $R_1$), clutch control is performed in accordance with the line $L_1$. However, in addition to the line $L_1$, a plurality of additional control lines may be provided rightward with reference to the line $L_1$, thereby performing clutch control operation more elaborately in accordance with the magnitude of the engine speed. Similarly, when the engine speed is higher than the threshold value $N_B$ (i.e., in the range $R_3$), a plurality of additional control lines may be provided leftward with reference to the line $L_3$ in addition to the line $L_3$, whereby clutch control may be performed more elaborately in accordance with the magnitude of the engine speed.

Figure 7:
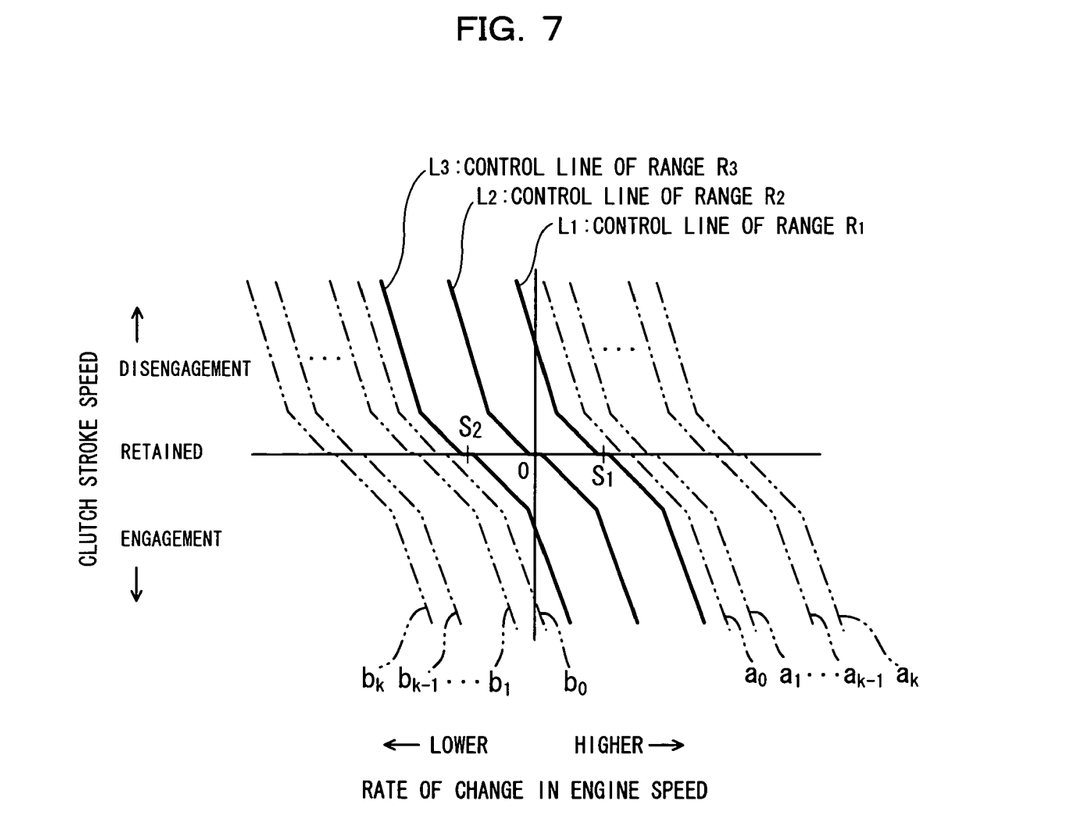
FIG. 7 is a map for a modification of the present invention.

More specifically, a plurality of (e.g., "n") sub-threshold values are set at an engine speed lower than the threshold value $N_A$ (i.e., low engine speed sub-threshold values). As shown in FIG. 7, sub-control lines $a_0$, $a_1$, . . . $a_{k-1}$, $a_k$ corresponding to the ranges partitioned by the plurality of the sub-threshold values are added to the map. For example, the sub-control line $a_0$ shown in FIG. 7 is a line corresponding to a range between the threshold value $N_A$ and a sub-threshold value first appearing in the direction from the threshold value $N_A$ to the lower engine speed. The sub-control line $a_1$ is a line corresponding to a range between the fist sub-threshold value and a second sub-threshold value. The sub-control line $a_{k-1}$ is a line corresponding to a range between the $(n-1)^{th}$ sub-threshold value and the $n^{th}$ sub-threshold value. The sub-control line $a_k$ is a line corresponding to a range which is lower in engine speed than the $n^{th}$ sub-threshold value. Therefore, for example, the engine speed detected by the engine speed sensor 5 falls within the range between the first sub-threshold value and the second sub-threshold value with reference to the direction from the threshold value $N_A$ to the lower engine speed (i.e., the sub-control line $a_1$), the clutch stroke speed is increased toward the clutch disengagement direction to a greater extent than when the engine speed falls within the range between the threshold value $N_A$ and the first sub-threshold value (i.e., the sub-control line $a_0$).

In other words, a plurality of sub-threshold values are set at an engine speed which is lower than the threshold value $N_A$. When the engine speed detected by the engine speed sensor 5 falls within the range between the $(n+1)^{th}$ ("n" is a natural number) sub-threshold value and the $(n+2)^{th}$ sub-threshold value with reference to the direction from the threshold value $N_A$ to the low engine speed, the clutch stroke speed toward the clutch disengagement direction is increased as compared with the case where the engine speed falls within the range between the $n^{th}$ sub-threshold value and the $(n+1)^{th}$ sub-threshold value.

By means of such a configuration, when the engine speed detected by the engine speed sensor 5 is at a level which is lower in engine speed than the threshold value $N_A$, the clutch stroke speed toward the clutch disengagement direction can be increased stepwise as the engine speed falls to the lower engine speed, and hence a hike in the speed of the engine in the range $R_1$ can be controlled with high accuracy.

More specifically, a plurality of (e.g., "n") sub-threshold values are set at an engine speed higher than the threshold value $N_B$ (i.e., high engine speed sub-threshold values). As shown in FIG. 7, sub-control lines $b_0$, $b_1$, $b_{k-1}$, $b_k$ corresponding to the ranges partitioned by the plurality of the sub-threshold values are added to the map. For example, the sub-control line $b_0$ shown in FIG. 7 is a line corresponding to a range between the threshold value $N_B$ and a sub-threshold value first appearing in the direction from the threshold value $N_B$ to the higher engine speed. The sub-control line $b_1$ is a line corresponding to a range between the fist sub-threshold value and a second sub-threshold value. The sub-control line $b_{k-1}$ is a line corresponding to a range between the $(n-1)^{th}$ sub-threshold value and the $n^{th}$ sub-threshold value. The sub-control line $b_k$ is a line corresponding to a range which is higher in engine speed than the $n^{th}$ sub-threshold value. Therefore, for example, the engine speed detected by the engine speed sensor 5 falls within the range between the first sub-threshold value and the second sub-threshold value with reference to the direction from the threshold value $N_B$ to the higher engine speed (i.e., the sub-control line $b_1$), the clutch stroke speed is increased toward the clutch engagement direction as compared with the case where the engine speed falls within the range between the threshold value $N_B$ and the first sub-threshold value (i.e., the sub-control line $b_0$).

In other words, a plurality of sub-threshold values are set at an engine speed which is higher than the threshold value $N_B$. When the engine speed detected by the engine speed sensor 5 falls within the range between the $(n+1)^{th}$ ("n" is a natural number) sub-threshold value and the $(n+2)^{th}$ sub-threshold value with reference to the direction from the threshold value $N_B$ to the high engine speed, the clutch stroke speed toward the clutch engagement direction is increased as compared with the case where the engine speed falls within the range between the $n^{th}$ sub-threshold value and the $(n+1)^{th}$ sub-threshold value.

By means of such a configuration, when the engine speed detected by the engine speed sensor 5 is at a level which is higher in engine speed than the threshold value $N_B$, the clutch stroke speed toward the clutch engagement direction can be increased stepwise as the engine speed falls to the lower engine speed, and hence a drop in the speed of the engine in the range $R_3$ can be controlled with high accuracy.

Although in the foregoing descriptions a plurality of sub-threshold values are set at a level which is lower in engine speed than the threshold value $N_A$, as a matter of course, it may be the case that only one sub-threshold value is set. Similarly, although in the foregoing descriptions a plurality of sub-threshold values are set at a level which is higher in engine speed than the threshold value $N_B$, as a matter of course, it may be the case that only one sub-threshold value is set.

Although the sub-threshold values are set in both the ranges $R_1$ and $R_3$, it may be the case that the sub-threshold values is set in only one of the ranges $R_1$ and $R_3$.

In the embodiment, one line is selected from the map stored in the storage section 12. However, maps for the lines $L_1$, $L_2$, and $L_3$ (i.e., three maps) may be stored in the storage section 12, and any one may be selected from the three maps, to thereby control the clutch.

What is claimed is:

1. A clutch controller of a mechanical automatic transmission which enables automatic transmission operation by means of providing a transmission gear mechanism with an actuator and a clutch mechanism with an actuator, the controller comprising:
   engine speed detection means for detecting an engine speed;
   accelerator position detection means for detecting the position of an accelerator;
   range setting means for setting an engine speed range in which engine output torque falls within a predetermined range including a maximum value at the position of said accelerator detected by said accelerator position detection means; and
   control means which effects direct engagement of a clutch when a vehicle is pulled away while controlling a connected state of said clutch such that the engine speed detected by said engine speed detection means falls within said engine speed range set by said range setting means.

2. The clutch controller of the mechanical automatic transmission according to claim 1, wherein said range setting means sets a first threshold value at an engine speed lower than an engine speed at which said engine output torque becomes maximum at said position of said accelerator and sets a second threshold value at an engine speed higher than said engine speed, thereby setting said engine speed range.

3. The clutch controller of the mechanical automatic transmission according to claim 2, wherein said first threshold value and said second threshold value are set in accordance with said position of said accelerator.

4. The clutch controller of the mechanical automatic transmission according to claim 2, wherein said control means comprises
   a storage section for storing a map in which clutch stroke speeds corresponding to a rate of change in said engine speed are set with regard to three ranges; namely, a first range which is lower in engine speed than said first threshold value, a second range falling between said first threshold value and said second threshold value, and a third range higher in engine speed than said second threshold value;
   a determination section for determining which one of said three ranges that said engine speed detected by said engine speed detection means falls within; and
   a clutch control section which selects from said map a clutch stroke speed corresponding to the range determined by said determination section and controls said clutch stroke speed of said clutch.

5. The clutch controller of the mechanical automatic transmission defined in claim 4, wherein said storage section stores, as said map, control lines corresponding to said three ranges on coordinates formed from the rate of change in said engine speed and said clutch stroke speed;
   said control line of the second range is set so as to increase said clutch stroke speed in a clutch engagement direction when the rate of change in said engine speed has increased and to increase said clutch stroke speed in a clutch disengagement direction when the rate of said engine speed has decreased; and
   said control line of said first range is a line obtained as a result of said control line in said second range having been shifted toward an increase in the rate of change in said engine speed, and said control line of said third range is a line obtained as a result of said control line of said second range having been shifted toward a decrease in the rate of change in said engine speed.

6. The clutch controller of the mechanical automatic transmission defined in claim 4, wherein
   said storage section stores a map in which are set clutch stroke speeds corresponding to the rate of change in said engine speed in connection with a plurality of ranges into which said first range has been divided;
   said determination section determines which one of said plurality of ranges within said first range includes said engine speed detected by said engine speed detection means when said detected engine speed falls within said first range; and
   said clutch control section controls said clutch stroke speed of said clutch by means of selecting, from said map, a clutch stroke speed corresponding to said range determined by said determination section.

7. The clutch controller of the mechanical automatic transmission defined in claim 6, wherein said storage section stores, as said map, sub-control lines corresponding to said plurality of ranges within said first range on coordinates formed from the rate of change in engine speed and said clutch stroke speed; and
   said sub-control lines assigned to said plurality of ranges within said first range are formed by shifting at intervals said control line of said second range toward an increase in the rate of said engine speed.

8. The clutch controller of the mechanical automatic transmission defined in claim 4, wherein
   said storage section stores a map in which are set clutch stroke speeds corresponding to the rate of change in said engine speed in connection with a plurality of ranges into which said third range has been divided;
   said determination section determines which one of said plurality of ranges within said third range includes said engine speed detected by said engine speed detection means when said detected engine speed falls within said third range; and
   said clutch control section controls said clutch stroke speed of said clutch by means of selecting, from said map, a clutch stroke speed corresponding to said range determined by said determination section.

9. The clutch controller of the mechanical automatic transmission defined in claim 6, wherein
   said storage section stores a map in which are set clutch stroke speeds corresponding to the rate of change in said engine speed in connection with a plurality of ranges into which said third range has been divided;
   said determination section determines which one of said plurality of ranges within said third range includes said engine speed detected by said engine speed detection means when said detected engine speed falls within said third range; and
   said clutch control section controls said clutch stroke speed of said clutch by means of selecting, from said map, a clutch stroke speed corresponding to said range determined by said determination section.

10. The clutch controller of the mechanical automatic transmission defined in claim 8, wherein said storage section stores, as said map, sub-control lines corresponding to said plurality of ranges within said third range on coordinates formed from the rate of change in engine speed and said clutch stroke speed; and
    said sub-control lines assigned to said plurality of ranges within said third range are formed by shifting at intervals said control line of said second range toward a decrease in the rate of said engine speed.

11. The clutch controller of the mechanical automatic transmission defined in claim 9, wherein said storage section stores, as said map, sub-control lines corresponding to said plurality of ranges within said third range on coordinates formed from the rate of change in engine speed and said clutch stroke speed; and said sub-control lines assigned to said plurality of ranges within said third range are formed by shifting at intervals said control line of said second range toward a decrease in the rate of said engine speed.

12. A method for controlling a clutch of a mechanical automatic transmission which enables automatic transmission operation by means of providing a transmission gear mechanism with an actuator and a clutch mechanism with an actuator, the method comprising the steps of:

detecting an engine speed and the position of an accelerator;

setting a first threshold value at an engine speed lower than an engine speed at which said engine output torque becomes maximum at said detected position of said accelerator and setting a second threshold value at an engine speed higher than said engine speed; and effecting direct engagement of said clutch while controlling a connected state of said clutch such that said detected engine speed falls between said set first threshold value and said second threshold value.

13. The method for controlling a clutch of a mechanical automatic transmission according to claim 12, wherein, when said detected engine speed is lower than said first threshold value, said clutch is controlled so as to be disengaged; and, when said detected engine speed is higher than said second threshold value, said clutch is controlled so as to be engaged.

14. The method for controlling a clutch of a mechanical automatic transmission according to claim 12, wherein a low engine speed sub-threshold value is set at an engine speed which is lower than said first threshold value; and, when said detected engine speed is lower than said engine speed sub-threshold value, a clutch stroke speed is increased toward said clutch disengagement direction as compared with a case where said detected engine speed falls between said first threshold value and said low engine speed sub-threshold value.

15. The method for controlling a clutch of a mechanical automatic transmission according to claim 14, wherein a plurality of said low engine speed sub-threshold values are set at engine speeds lower than said first threshold value; and, when said detected engine speed falls between an $(n+1)^{th}$ (n; natural number) low engine speed sub-threshold value and an $(n+2)^{th}$ low engine speed sub-threshold value toward a lower engine speed from said first threshold value, said clutch stroke speed is increased toward said clutch disengagement direction as compared with a case where said detected engine speed falls between an $n^{th}$ low engine speed sub-threshold value and said $(n+1)^{th}$ low engine speed sub-threshold value.

16. The method for controlling a clutch of a mechanical automatic transmission according to claim 12, wherein a high engine speed sub-threshold value is set at an engine speed higher than said second threshold value; and, when said detected engine speed is higher than said high engine speed sub-threshold value, said clutch stroke speed is increased toward said clutch engagement direction as compared with a case where said detected engine speed falls between said second threshold value and said high engine speed sub-threshold value.

17. The method for controlling a clutch of a mechanical automatic transmission according to claim 14, wherein a high engine speed sub-threshold value is set at an engine speed higher than said second threshold value; and, when said detected engine speed is higher than said high engine speed sub-threshold value, said clutch stroke speed is increased toward said clutch engagement direction as compared with a case where said detected engine speed falls between said second threshold value and said high engine speed sub-threshold value.

18. The method for controlling a clutch of a mechanical automatic transmission according to claim 16, wherein a plurality of said high engine speed sub-threshold values are set at engine speeds higher than said second threshold value; and, when said detected engine speed falls between an $(n+1)^{th}$ (n; natural number) high engine speed sub-threshold value and an $(n+2)^{th}$ high engine speed sub-threshold value toward a higher engine speed from said second threshold value, said clutch stroke speed is increased toward said clutch engagement direction as compared with a case where said detected engine speed falls between an $n^{th}$ high engine speed sub-threshold value and said $(n+1)^{th}$ high engine speed sub-threshold value.

19. The method for controlling a clutch of a mechanical automatic transmission according to claim 17, wherein a plurality of said high engine speed sub-threshold values are set at engine speeds higher than said second threshold value; and, when said detected engine speed falls between an $(n+1)^{th}$ (n; natural number) high engine speed sub-threshold value and an $(n+2)^{th}$ high engine speed sub-threshold value toward a higher engine speed from said second threshold value, said clutch stroke speed is increased toward said clutch engagement direction as compared with a case where said detected engine speed falls between an $n^{th}$ high engine speed sub-threshold value and said $(n+1)^{th}$ high engine speed sub-threshold value.

* * * * *